United States Patent
Lokere et al.

(10) Patent No.: US 9,102,288 B2
(45) Date of Patent: Aug. 11, 2015

(54) NON-ANCHORING CORDS WITH NON-CHEMICALLY BINDING WITH THE MATRIX IN IMPACT BEAM

(75) Inventors: Erwin Lokere, Kortrijk (BE); Jeroen Gallens, Lede (BE); Veerle Van Wassenhove, Aarsele (BE); Hendrik Rommel, Sint-Michiels (BE)

(73) Assignees: NV BEKAERT SA, Zwevegem (BE); VOESTALPINE POLYNORM VAN NIFTRIK BV, Putte (NL); BASF SE, Ludwigshafen (DE)

( * ) Notice: Subject to any disclaimer, the term of this patent is extended or adjusted under 35 U.S.C. 154(b) by 0 days.

(21) Appl. No.: 14/346,189
(22) PCT Filed: Jun. 21, 2012
(86) PCT No.: PCT/EP2012/061918
§ 371 (c)(1), (2), (4) Date: Mar. 20, 2014
(87) PCT Pub. No.: WO2013/041255
PCT Pub. Date: Mar. 28, 2013

(65) Prior Publication Data
US 2014/0217757 A1 Aug. 7, 2014

(30) Foreign Application Priority Data
Sep. 21, 2011 (EP) ..................................... 11182164

(51) Int. Cl.
*B60R 19/18* (2006.01)
*B60R 19/03* (2006.01)
(Continued)

(52) U.S. Cl.
CPC .................. *B60R 19/18* (2013.01); *B29C 70/48* (2013.01); *B29C 70/56* (2013.01); *B29C 70/885* (2013.01);
(Continued)

(58) Field of Classification Search
CPC ........... B60R 19/03; B60R 2019/1853; D03D 19/00; D03D 1/00; B29C 70/56
USPC ............. 296/120, 132; 264/257; 57/210, 238; 428/221
See application file for complete search history.

(56) References Cited

U.S. PATENT DOCUMENTS 5,174,934 A * 12/1992 Saatchi ......................... 264/46.4
6,601,378 B1 * 8/2003 Fritsch et al. .................... 57/238
(Continued)

FOREIGN PATENT DOCUMENTS

EP  1 483 137 B1  4/2007
JP  8-335410 A  12/1996
(Continued)

*Primary Examiner* — Pinel Romain
(74) *Attorney, Agent, or Firm* — Foley & Lardner LLP

(57) ABSTRACT

An impact beam (40) comprises a polymer matrix and a reinforcing structure, the structure comprises a number of metal reinforcing cords (22) and non-metal elongated binding elements (26) or non-metal coated elongated binding elements arranged between the cords for holding the metal reinforcing cords together. Each of the metal cords has a metallic cross-sectional area Ametal, and the ratio of the metallic area Ametal to the area of the circumscribed circle (πdcord2/4) is at least 0.60. The metal cords further have a non chemically binding with the matrix, and non-metal elongated binding elements or non-metal coated elongated binding elements have a chemical bond with said polymer matrix. By not having a mechanical interlocking and a non chemically binding with the matrix, the whole metal cord is stressed and not a local point while in the latter case the metal cord would locally break due to the very high impact forces. Therefore, the structural integrity of the impact beam as subject of the invention can be improved significantly during and after impact.

16 Claims, 4 Drawing Sheets

(51) Int. Cl.
  *D03D 19/00* (2006.01)
  *B29C 70/48* (2006.01)
  *B29C 70/56* (2006.01)
  *B29C 70/88* (2006.01)
  *D03D 1/00* (2006.01)
  *D03D 15/02* (2006.01)
  *B29L 31/30* (2006.01)

(52) U.S. Cl.
  CPC *B60R 19/03* (2013.01); *D03D 1/00* (2013.01); *D03D 15/02* (2013.01); *D03D 19/00* (2013.01); *B29K 2995/0089* (2013.01); *B29L 2031/3044* (2013.01); *B60R 2019/1813* (2013.01); *B60R 2019/1853* (2013.01); *D10B 2101/20* (2013.01); *D10B 2505/02* (2013.01); *D10B 2505/12* (2013.01)

(56) References Cited

U.S. PATENT DOCUMENTS

| | | | |
|---|---|---|---|
| 6,883,843 B2* | 4/2005 | Van Damme et al. | 293/120 |
| 8,220,850 B2* | 7/2012 | Opperman et al. | 293/120 |
| 8,922,100 B2* | 12/2014 | Whinnery | 310/367 |
| 2005/0153098 A1* | 7/2005 | Bhatnagar et al. | 428/113 |
| 2006/0013990 A1 | 1/2006 | Brentrup | |
| 2007/0218230 A1 | 9/2007 | Lokere | |
| 2007/0235595 A1 | 10/2007 | Braekevelt | |
| 2010/0266831 A1 | 10/2010 | Durie et al. | |
| 2014/0109783 A1* | 4/2014 | Queen et al. | 101/401.1 |

FOREIGN PATENT DOCUMENTS

| | | |
|---|---|---|
| WO | WO 99/20682 A1 | 4/1999 |
| WO | WO 2004/101909 A1 | 11/2004 |
| WO | WO 2005/103545 A1 | 11/2005 |
| WO | WO 2009/062764 A1 | 5/2009 |

\* cited by examiner

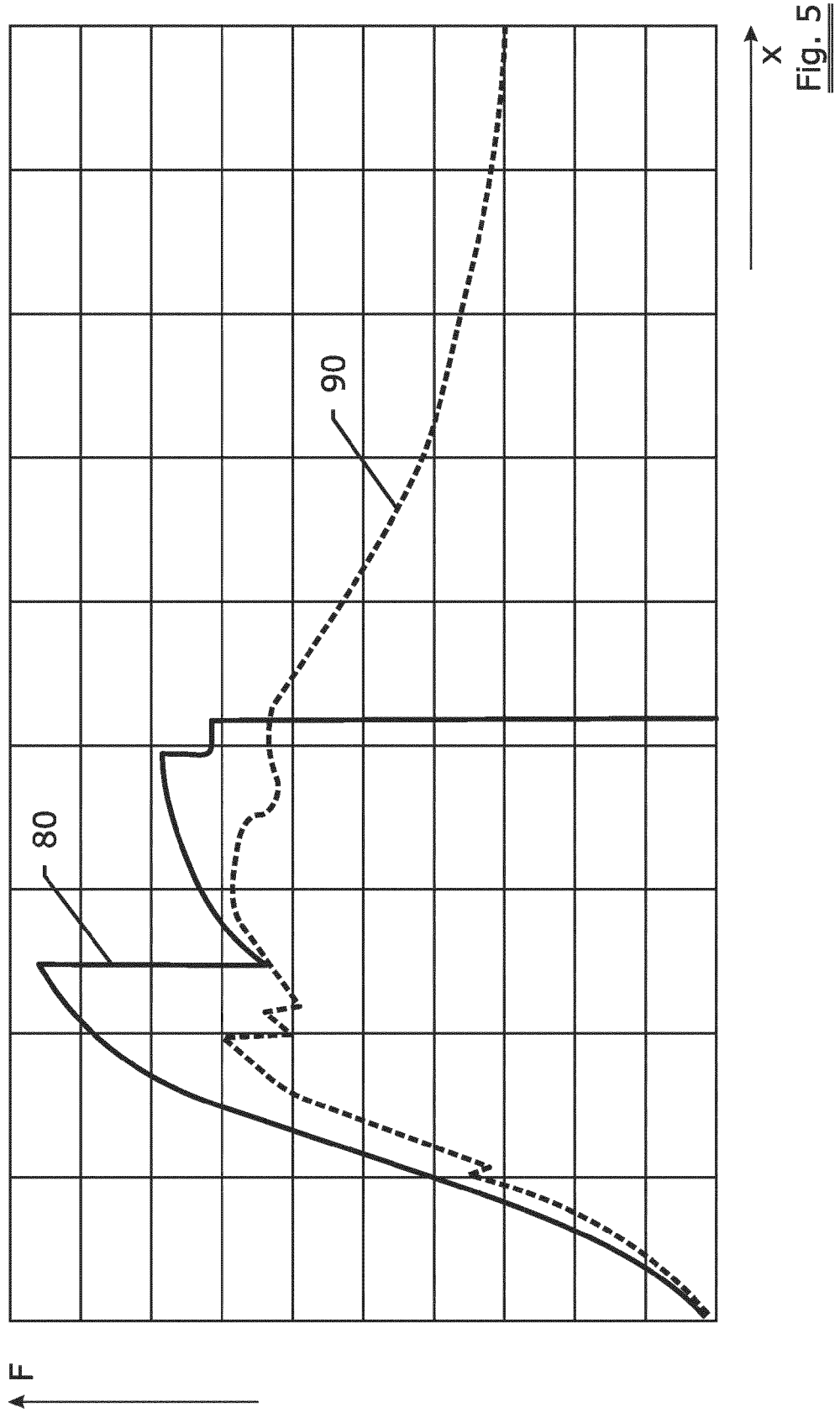

ent invention relates to impact beams and rein-
NON-ANCHORING CORDS WITH NON-CHEMICALLY BINDING WITH THE MATRIX IN IMPACT BEAM

TECHNICAL FIELD

The present invention relates to impact beams and reinforcements, and a method to provide such impact beams. The invention further relates to the use of impact beams for support of bumpers of vehicles or for impact reinforcing of parts of vehicles.

BACKGROUND ART

Presently known composite impact beams comprise a polymer matrix, reinforced with glass fibres or other polymer fibres.

An impact beam may also comprise metal parts, usually on the places where the impact beam receives compression load during impact.

For instance, EP-B1-1 483 137 discloses an impact beam with a polymer matrix and a metal reinforcing structure comprising metal cords which are preferably embedded in a strip. The metal cords are of a type which can absorb relatively high amounts of impact energy. Such an impact beam has an improved resistance to impact resulting from a collision and has an improved integrity during and after the impact. However, when the impact beam is manufactured by means of an injection moulding process, problems of a different nature can occur. It has for instance been found that it is difficult to obtain by injection moulding a reinforcing structure that avoids brittle behaviour of the impact beam during impact. Either a stiff material is obtained with good quasistatic properties and these materials show a brittle failure at impact. When using for instance a PP (Polypropylene) material, these static properties are not sufficient.

Also known are impact beams which are constructed from a semifinished sheet comprising a textile product. The textile product comprises a separate textile layer of non-metallic fibres and a number of metal cords. For instance, US 2006/013990 discloses an impact beam with a semifinished sheet comprising a polymer matrix and a textile product comprising metal cords which are preferably stitched to the separate textile layer. The metal cords are of a type which can absorb relatively high amounts of impact energy. Such an impact beam reduces or solves the problem of migration of the cords during pressing. The known impact beam does however have a few drawbacks. As the metal cords are bond to the layer of non-metallic fibres by means of stitches, it would involve one or more steps in the production process as compared to the only one manufacture step of a common textile product. Besides, as the separated textile layer as well as the stitched steel cords has a good mechanical and chemical anchoring of the polymer matrix, it would be impossible to allow some movements of the steel cords within the matrix. Therefore, much possibility that the metal cords would locally break due to the very high impact forces while impact happens. It has turned out, however, that the fracture resistance to impact resulting from a collision is at a high risk and that structural integrity during and after the impact has dramatically decreased.

DISCLOSURE OF INVENTION

It is an object of the invention to provide an improved impact beam wherein at least one of the above stated prior art drawbacks is obviated.

It is also an object of the present invention to provide a reinforcing structure for impact beam that shows a better ductility and an improved fracture resistance to impact.

It is still another object of the present invention to provide an impact beam where the metal cords are kept at equal distances without requiring the need for an additional process step.

It is a further object of the invention to provide a method for manufacturing an impact beam provided with such a reinforcing structure.

An impact beam as subject of the invention comprises a polymer matrix and a reinforcing structure. According to the present invention, the structure comprises a number of metal reinforcing elongated cords and non-metal elongated binding elements or non-metal coated elongated binding elements arranged between the cords for holding the metal reinforcing cords together. The metal cords and the non-metal elongated binding elements or non-metal coated elongated binding elements are forming a hybrid structure, e.g. a hybrid fabric, where the term "hybrid" refers to the combination of metal and non-metal elements.

Each of the metal cords used for the reinforcement of impact beams must obey a simple relation $$\varphi_c = \frac{A_{metal}}{\frac{\pi d_{cord}^2}{4}} \geq 0.60$$

Where the symbols have the following meaning
$\phi_c$ is the metallic fill factor i.e. the ratio of the metallic area of the wires in the cord to the area of the circumscribed circle of the cord. As metallic area $A_{metal}$, the sum of the perpendicular cross sectional areas of filaments is taken (in line with DIN 3051, part 3).

$d_{cord}$ is the diameter of the circumscribed circle of the cord.
$\pi/4$ is a geometry factor finding its origin in the fact that the steel cords are considered to be round.

The ratio of the metallic area $A_{metal}$ to the area of the circumscribed circle ($\pi d_{cord}^2/4$)—or $\phi_c$ as defined above—must be at least 0.60. This is a measure for the degree of "openness" of the cord. The higher the number, the less polymer can ingress into the cord, and if less polymer can enter the cord it will be better to allow some movement between the cord and the matrix. Hence, the type of metal cords should be used that do not have a good mechanical anchorage with the matrix material. This lack of anchorage contributes to the furtherance of creating a ductile composite material and increasing the amount of impact that can be absorbed in impact beams. Besides, as the metal cords have a non chemically binding with the matrix while the non-metal elongated binding elements or non-metal coated elongated binding elements have a chemical bond with said polymer matrix, it would further contribute to the ductility of the metal cords to a large extent within the matrix, which may also have a positive effect on the amount of impact that can be absorbed in impact beams. At impact the metal cords should function first as energy absorber by taking up a small amount of energy to come loose from the matrix and from then on are put at their full strength due to the movement within the matrix as the metal cords do have a non chemically binding with the matrix. By not having the mechanical interlocking or a good chemical adhesion with the matrix, the whole cord length is stressed and not a local point while in the latter case the metal cord would locally break due to the very high impact forces. Therefore, the structural integrity of the impact beam as subject of the invention can be improved significantly during and after impact.

As explained, a too good anchorage between the metal cords and the matrix is to be avoided and so is a too good chemical bond between the metal cords and the matrix. However, a good chemical bond between the non-metal elongated binding elements or non-metal coated elongated binding elements and the matrix has proved to be beneficial.

In order to assure a good adhesion between the non-metal elongated binding elements or non-metal coated elongated binding elements and the polymer material, an adhesion promoter can be applied on the non-metal elongated binding elements or non-metal coated elongated binding elements. Possible adhesion promoters are bifunctional coupling agents such as silane compounds. One functional group of these coupling agents is responsible for the binding with the non-metal elongated binding elements or non-metal coated elongated binding elements, the other functional group reacts with the polymer. That's to say, the non-metal elongated binding elements or non-metal coated elongated binding elements is having a chemical bond with said polymer matrix.

After an optional cleaning operation, the non-metal elongated binding elements or non-metal coated elongated binding elements are then coated with a primer selected from organo functional silanes, organo functional titanates and organo functional zirconates which are known in the art for said purpose. Preferably, but not exclusively, the organo functional silane primers are selected from the compounds of the following formula:

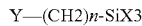

wherein:

Y represents an organo functional group selected from —NH2, CH2=CH—, CH2=C(CH3)COO—, 2,3-epoxypropoxy, HS— and, Cl—

X represents a silicon functional group selected from OR, —OC(=O)R', —Cl wherein R and R' are independently selected from C1 to C4 alkyl, preferably —CH3, and —C2H5; and n is an integer between 0 and 10, preferably from 0 to 10 and most preferably from 0 to 3.

The organo functional silanes described above are commercially available products. More details about these coupling agents can be found in the PCT application WO-A-9920682. Unless specified, all kinds of material made from the polymer matrix underneath mentioned are mixed with one kind of possible adhesion promoters; non-metal elongated binding elements or non-metal coated elongated binding elements mentioned underneath are coated with a layer of another possible adhesion promoters. Much possibility that the two kinds of possible adhesion promoters are bifunctional coupling agents.

An impact beam as subject of the invention comprises thermoplastic polymer material.

The polymer matrix may comprise polymer material, being a thermoplastic or thermoplastic elastomer polymer material. More preferred, the polymer material is selected from the group consisting of polypropylene, polyethylene, polyamide, polyethylene terephtalate, polybutylene terephtalate, polycarbonate, polyphenylene oxide as well as blends of these materials, or thermoplastic elastomers, e.g. polyamide- or polyolefin-based thermoplastic elastomers such as polyesteramides, polyetheresteramides, polycarbonate-esteramides or polyether-block-amides.

The polymer matrix may further comprise glass- or C-fibers, polymeric fibers and/or mineral fillers to reinforce the polymer matrix. Fibers can either be random, unidirectional, woven; stitched, chopped, or a combination of those.

An impact beam is characterized by a direction in which impact forces are expected to work on the impact beam. This direction is hereafter referred to as 'impact direction". Impact beams are characterized by an impact plane, being the plane perpendicular to the direction of impact. One dimension of this plane is usually relatively large and is hereafter referred to as length of the impact beam. The second dimension of the impact beam in this impact plane is usually much smaller than the length. This direction is hereafter referred to as height of the impact beam. The dimension of the impact beam, perpendicular to impact plane is referred to as thickness of the impact beam.

The metal cords of an impact beam as subject of the invention may be provided in one direction or two directions.

Preferably, the metal cords are provided in the direction of the length of the impact beam which is placed perpendicular to the height of the impact beam. A number of metal reinforcing cords parallel to each other are provided with non-metal elongated binding elements or non-metal coated elongated binding elements arranged between the cords for holding the metal reinforcing cords together. Each non-metal element or non-metal coated elongated binding element follows a certain path through or along the metal cords to provide a hybrid fabric before molding of the impact beam as subject of the invention. Then during molding of the impact beam, the hybrid fabric can be provided with a curved shape. The curved surface "draped" around the plane defined by the length and height, and bended in a direction defined by the length and thickness of the impact beam. The curvature in thickness direction preferably extends to the side of the impact beam on which the impact force is to be expected to work.

More preferably, the distance between adjacent metal cords in said direction of the length of the impact beam is substantially equal to each other. If these distances differ from each other, the amounts of impact energy absorption may be inhomogeneous, which can not ensure the equal distribution of the impact energy. The location which is exposed to the highest amounts of impact energy will tend to break first, which will cause further damage of the whole impact beam as well as other objects. Obviously, the homogeneous distance between adjacent metal cords can not only be another contribution to the improved integrity of the impact beam, but also increase the resistance to impact dramatically during and after impact.

Preferably however, the metal cords are provided in two directions where warp and weft are essentially perpendicular towards each other.

The wording "essentially perpendicular" is to be understood in a sense that for each pair of metal cords with one metal cord in the warp direction and the other from the weft, said cords being contacted with each other, the angle between warp and weft is about 90 degrees, e.g. 89 degrees or 92 degrees or even 95 degrees.

According to the present invention, a number of metal reinforcing cords parallel to each other are provided in the warp direction and another number of metal reinforcing cords are designed to be arranged in the weft direction attached together with the metal reinforcing cords in the warp direction. Each non-metal element or non-metal coated elongated binding element follows a certain path through the metal cords not only in the warp direction but also in the weft direction to provide a hybrid fabric. And the hybrid fabric is fixed in the plane perpendicular to the direction of the impact with the weft direction or the warp direction parallel to the length of the impact beam before molding of the impact beam as subject of the invention. This hybrid fabric is also provided with a curved shape during molding of the impact beam, as described above.

More preferably, the distance between adjacent metal cords of said warp is substantially identical to the distance between adjacent metal cords of said weft. This allows for similar advantages as described above in tha equal distribution of the impact energy can be ensured and resistance to impact dramatically during and after impact can be increased.

Most preferably steel cords are used to provide the impact beam as subject of the invention. Presently known steel alloys may be used to provide the steel cords. Possibly, the steel cords are subjected to a stress relieving thermal treatment, e.g. by passing the steel cord through a high-frequency or mid-frequency induction coil of a length that is adapted to the speed of the steel cord during production. It was observed that, increasing the temperature to more than 400° C. for a certain period of time, a decrease in tensile strength of the steel cord (a reduction of approximately 10%), but at the same time, an increase of the plastic elongation of the cord before rupture of more than 6% may be obtained.

The steel cords preferably used for an impact beam as subject of the invention, are of a type which can satisfy the formula $\phi_c \geq 0.6$ as defined above. Examples here are:

Compact cords, e.g. of the 1×n type, i.e. steel cords comprising n steel cords, n being greater than 3, twisted in only one direction with one single step to a compact cross-section, such as 1×9×0.385 mm or 1×12×0.265 mm or 1×27×0.175 mm; the last number is the diameter of each wire, expressed in mm; all steel wires of the compact cords may have the same diameter as described above, or the diameters of the steel wires may differ from each other, e.g. 3×0.265 mm+9×0.245 mm or 1×0.225 mm+18×0.175 mm, the latter number of each multiplier is the diameter of the wires, expressed in mm.

Layered metal cords, e.g. of the l+m (+n) type, i.e. metal cords with a core of l wires, surrounded by a layer of m wires, and possibly also surrounded by another layer of n wires, such as 4+10×0.30 mm, the last number is the diameter of each wire, expressed in mm.

The anchoring force fa per unit length of the steel cords in the matrix polymer is in general less than 18 N/mm, e.g. less than 15 N/mm, e.g. less than 10 N/mm.

For polyamide matrices, the anchoring force fa is less than 18 N/mm.

For polypropylene matrices, the anchoring force fa is less than 10 N/mm.

A method for providing an impact beam as subject of the invention, comprises the steps of
  providing metal cords and non-metal elongated binding elements or non-metal coated elongated binding elements;
  providing a hybrid fabric;
  bringing the hybrid fabric in an injection mold and positioning the hybrid fabric in the mold;
  injecting polymer material to said hybrid fabric, providing an impact beam;
  cooling the impact beam.

According to the present invention, the terms "impact beam" refer to light weight structural parts of a car where impact resistance is of relevance. An 'impact beam' can be a front bumper, a rear bumper, one or two beams in the front door, one or two beams in the rear door, the A-pillar or A-post, the B-pillar or B-post, the C-pillar or C-post and the D-pillar or D-post; spare wheel well; or battery casing (for hybrid or electrical cars).

BRIEF DESCRIPTION OF FIGURES IN THE DRAWINGS

FIG. 1a being schematically a view of a cross-section of an impact beam as subject of the invention;

FIG. 1b being schematically a front view of an impact beam as subject of the invention;

FIG. 1c being schematically a front view of a hybrid fabric for impact beam reinforcement as subject of the invention;

FIG. 2 and FIG. 3 being schematically a view of a cross section of an alternative impact beam as subject of the invention.

FIG. 5 shows the force-displacement curve of two types of beams.

MODE(S) FOR CARRYING OUT THE INVENTION

Figure 1A:
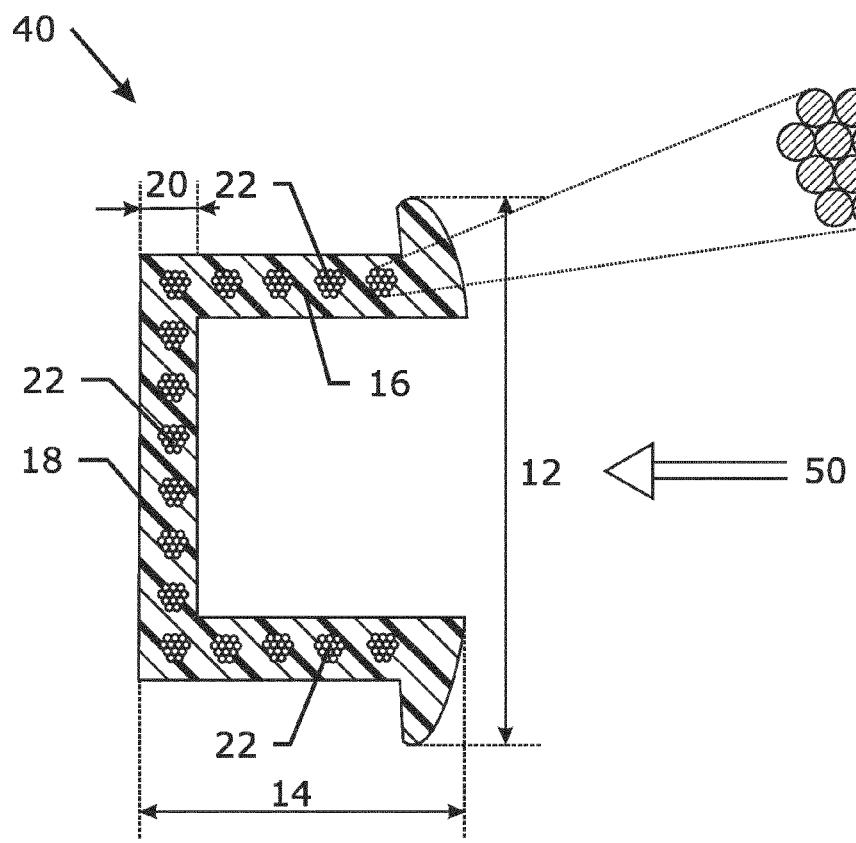
Figure 1B:
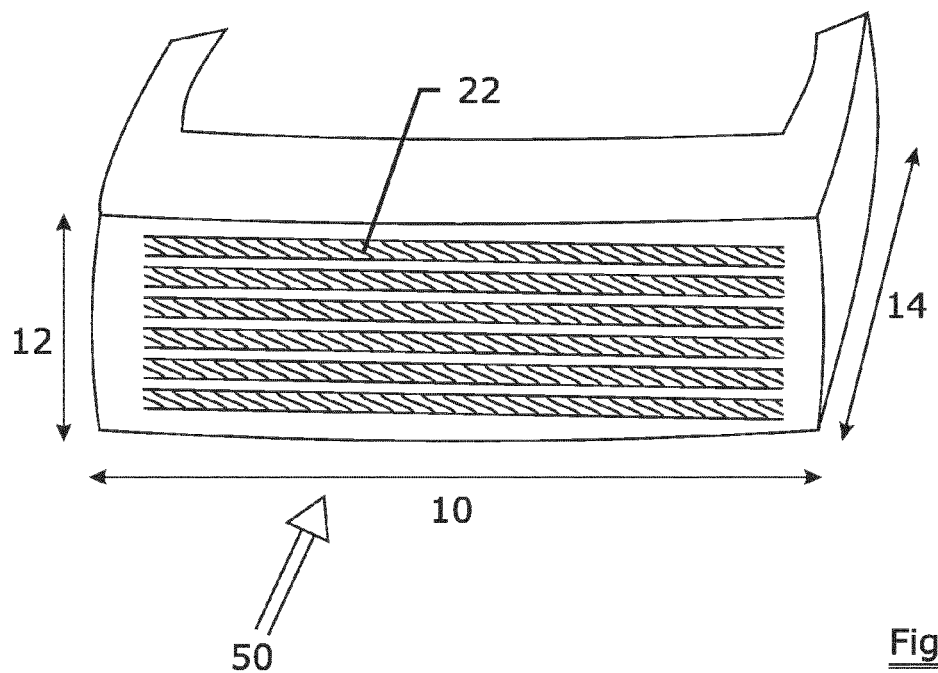

An impact beam as subject of the invention is schematically shown in FIG. 1a and FIG. 1b.

An impact beam 40 has a length 10, which is substantially larger than the height 12 and the thickness 14 of the impact beam 40. The embodiment as shown in FIG. 1a has a thickness that is provided by a pair of legs 16 and a main volume 18. The legs 16 may be used to fix the impact beam to other parts of the object to which it is to be mounted, but also contribute to the impact strength of the beam, whereas the main volume 18 (with its thickness 20) will absorb most of the impact energy provided by an impact in direction as indicated with arrow 50.

In the FIG. 1a, the main volume 18 and the legs 16 comprise a polymer matrix. And in both the main volume 18 and the legs 16, a hybrid fabric 22 is present. As discussed higher, the curvature is open towards impact and thus after contributing first to the impact absorption upon first impact, the legs 16 will bend open into a plane perpendicular to the impact direction as indicated with arrow 50 and together with the main volume 18 absord the impact.

In the FIG. 1b, the curvature of the legs towards impact is less critical as here it is the main volume 18 that is contributing to the impact strength of the beam.

Figure 1C:
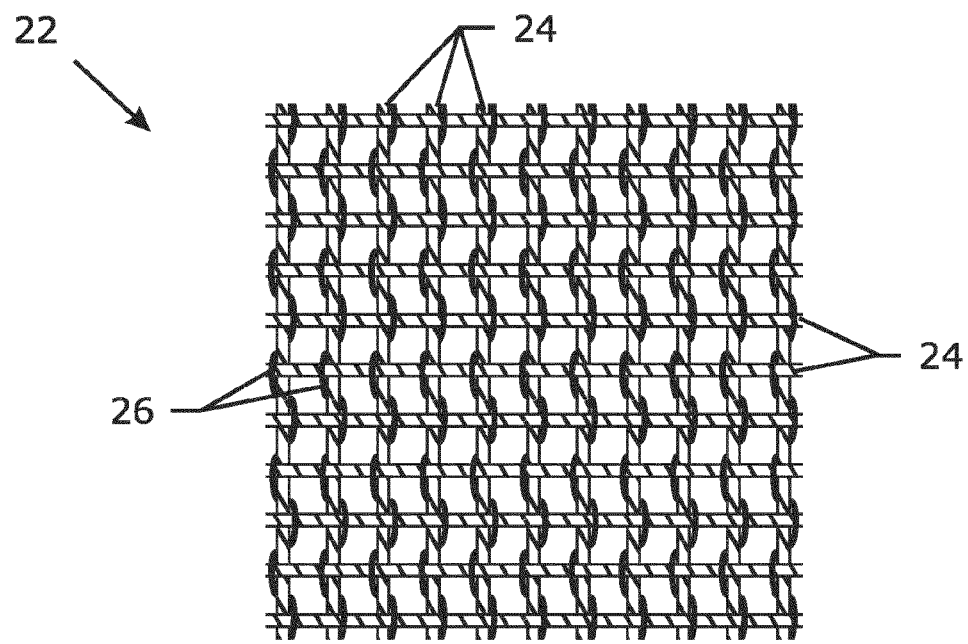

The metal cords 24 used to provide the hybrid fabric 22 as shown in FIG. 1c were 3+9 cords, being a core strand of a filament of 0.24 mm, round which 9 filaments of 0.225 mm are twisted in only one direction with one single step to a compact cross-section. Such metal cords 24 are provided in two directions where warp and weft are essentially perpendicular towards each other and the distance between adjacent metal cords of said warp is the same as the distance between adjacent metal cords of said weft. Then the non-metal element 26 follows a certain path through the metal cords 24 to provide the hybrid fabric 22 before molding of the impact beam as subject of the invention.

The matrix is a polyamide-based thermoplastic elastomer. More details about selected coupling agents, one of which is responsible for the non-metal element 26 and the other is reacting with the polymer of the main volume 18 and the pair of legs 16 can also be found in the PCT application WO-A-9920682.

Figure 2:
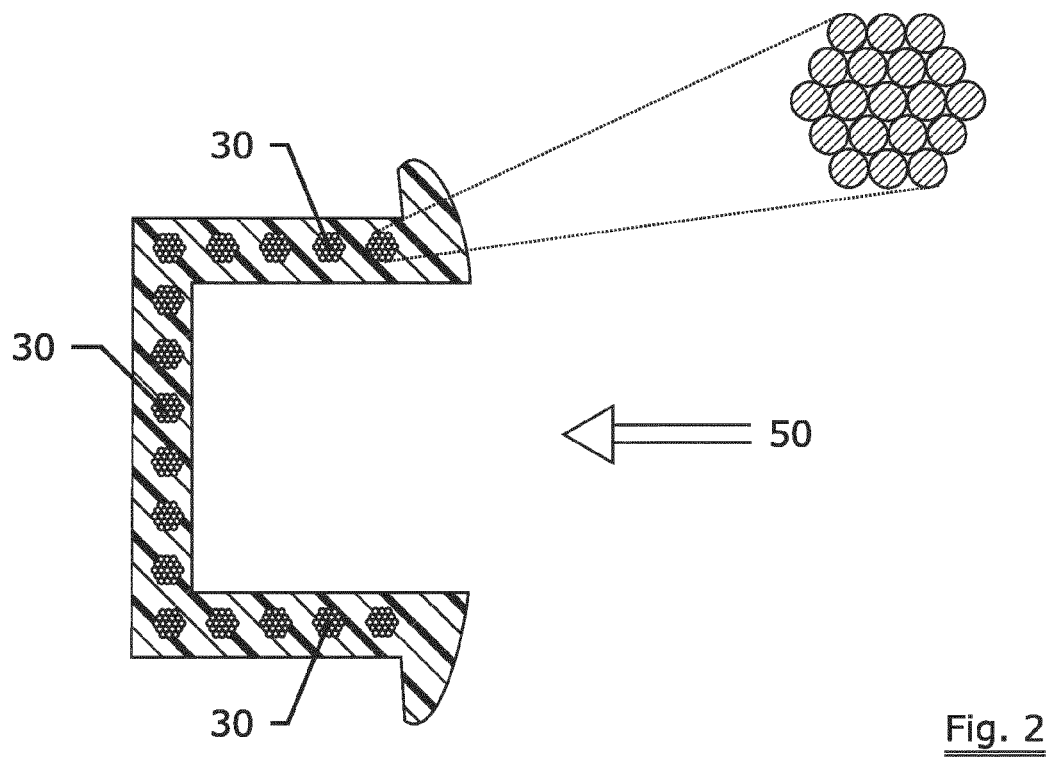
Figure 3:
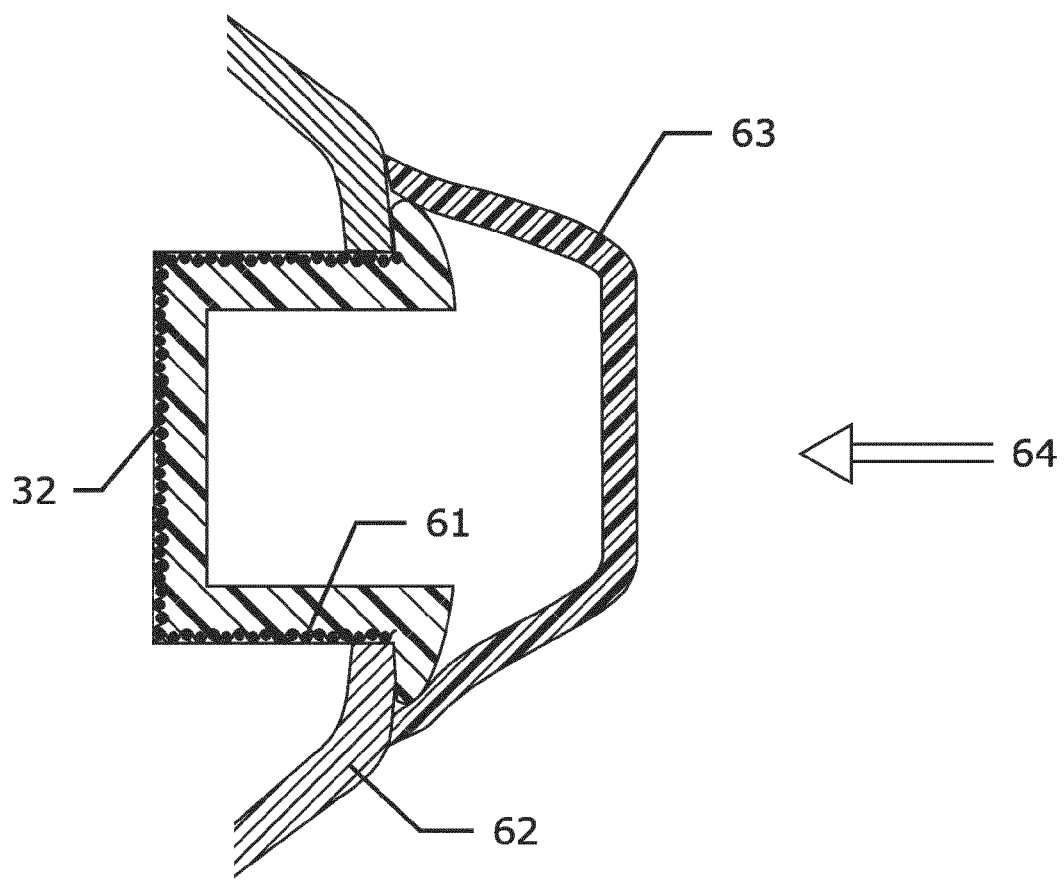

Alternative embodiments are shown in FIG. 2 and FIG. 3.

FIG. 2 shows an impact beam as subject of the invention which comprises a hybrid fabric 30 with another type of metal cord. The metal cords used to provide the hybrid fabric were 1×19 compact cords, being a core of a filament 0.34 mm, around which 18 filaments of 0.30 mm are twisted. Type polymer material of the matrix was a polypropylene-based thermoplastic elastomer.

FIG. 3 shows another alternative embodiment of an impact beam as subject of the invention. The hybrid fabric 32 only comprises metal cords in the direction of the length of the impact beam with the identical distance between adjacent metal cords. Then the non-metal element follows another certain path through the metal cords to binding all the metal cords together. The metal cords used to provide the hybrid fabric were 4+10 cords with all the filaments of 0.38 mm. The 4+10×0.38 construction consists of 4 filaments twisted together with a certain lay direction and length. In a subsequent operation 10 filaments are twisted around the core with a lay direction opposite to the core lay direction and with a lay length different from the core lay length. The matrix is a polyimide-based thermoplastic elastomer.

Table 1 enumerates a number of cords that have been investigated for their suitability to be used in a hybrid fabric for the reinforcement of an impact beam. The columns (A) through (F) contain the following:

(A) A numeral in order to identify the cord (B) A short cord type description. The two letter codes behind the formula categorises the breaking strength of the filaments used for the construction:

NT Normal Tensile
HT High Tensile
ST Super Tensile

Definitions for target tensile strength (N/mm$^2$), while d is the diameter of the filament (mm):

$$NT=3250-2000 \times d$$

$$HT=3800-2000 \times d$$

$$ST=3980-2000 \times d$$

Note that within each strength class, the tensile strength diminishes with increasing filament diameter.

(C) The diameter of the cord $d_{cord}$. The diameter has been determined by means of an optical profiloscope in which the silhouette of a straightened part of the cord—covering more than ten lay lengths of the cord—is precisely matched between two parallel lines. The distance between the lines is the optical diameter.

(D) Is the breaking load of the cord $F_b$.

(E) Is the fill factor of the cord φc as defined before.

(F) The anchoring force per unit length of cord fa. fa is determined by embedding the metal cord in a block of polymer matrix material over a length of 25.4 mm. After proper cooling, the steel cord is longitudinally pulled out and the maximum force is registered. fa is then equal to the force divided by the embedment length and is expressed in N/mm. More details about the test can be found in the PCT application WO-A-5103 545. Only a few of the constructions below are fitted to solve the non-anchoring problem of impact beam reinforcement structures as will be demonstrated as follows.

TABLE 1

| A Nr | B Cord Type | C dcord/mm | D Fb/N | E φc | F fa/(N/mm) |
|---|---|---|---|---|---|
| 1 | 7 × 3 × 0.15 NT | 0.91 | 975 | 0.57 | 12.8 |
| 2 | 3 × 0.24 + 9 × 0.225 HT | 0.95 | 1510 | 0.7 | 3.7 |
| 3 | 0.34 | 18 × 0.30 HT | 1.53 | 4007 | 0.74 | 5.5 |

TABLE 1-continued

| A Nr | B Cord Type | C dcord/mm | D Fb/N | E φc | F fa/(N/mm) |
|---|---|---|---|---|---|
| 4 | 4 + 10 × 0.38 ST | 1.65 | 4791 | 0.74 | 8.6 |
| 5 | (4) + (6) × 0.30 HT | 1.22 | 2172 | 0.58 | 11.9 |

Nr. 1. The "7 × 3 × 0.15" is multi-strand construction consisting of 6 strands twisted around a central strand. All strands consist of 3 filaments having a filament diameter of 0.15 mm twisted together with a lay opposite to the lay of the strands in the cable.

Nr. 5. The "(4) + (6) × 0.30" consists of two strands that are twisted around each other with a certain cord lay length. Both strands are totally different in nature. The strand containing 4 filaments has a very long lay length; the strand containing 6 filaments has a lay direction and a lay length close or equal to the lay direction and length of the cord. The diameter of all the filaments is equal to 0.30 mm.

Considering all of the above, it will be clear to the person skilled in the art that the constructions that are best suited to reinforce a hybrid fabric for impact beam reinforcement are of type Nr.2 to Nr.4. The cords type Nr.1 and Nr.5 have a too good anchoring with the matrix material (due to the mechanical locking with the matrix) relative to their breaking strength. Upon impact, only the individual elements of the cord will see parts of the load and this force will be higher than the strength of the steel elements. The other cord types Nr.2 to Nr.4 have compared to their tensile strength a lower anchoring and thus upon impact, after overcoming this anchoring force, the cords as a whole will take up (and transfer) the load.

Turning now to a method to provide an impact beam being subject of the invention. A hybrid fabric is made by weaving the non-metal elongated binding elements together with the metal cords or by warp knitting non-metal elongated binding elements with the metal cords. When the thus formed hybrid fabric is placed at the opposite side of the injection molding by means of magnets which are integrated in one of the two tool parts of the tool and then thermoplastic material is injected, the thermoplastic material will enclose the hybrid fabric but also upon the closing of the mould, the hybrid fabric will bend into a curved shape because of a large amount of the pressure strength. The curved surface "draped" around the plane defined by the length and height, and bended in a direction defined by the length and thickness of the impact beam. The curvature in thickness direction preferably extends to the side of the impact beam on which the impact force is to be expected to work. The cross-section of an impact beam as subject of the invention can be schematically shown as FIG. 1a.

After this molding, the mold and the shaped impact beam are cooled to a temperature for which the polymer material is solidified. The impact beam may then be taken out of the mold and is ready for further processing, such as quality control or provision of additional openings.

Figures 4A, 4B:
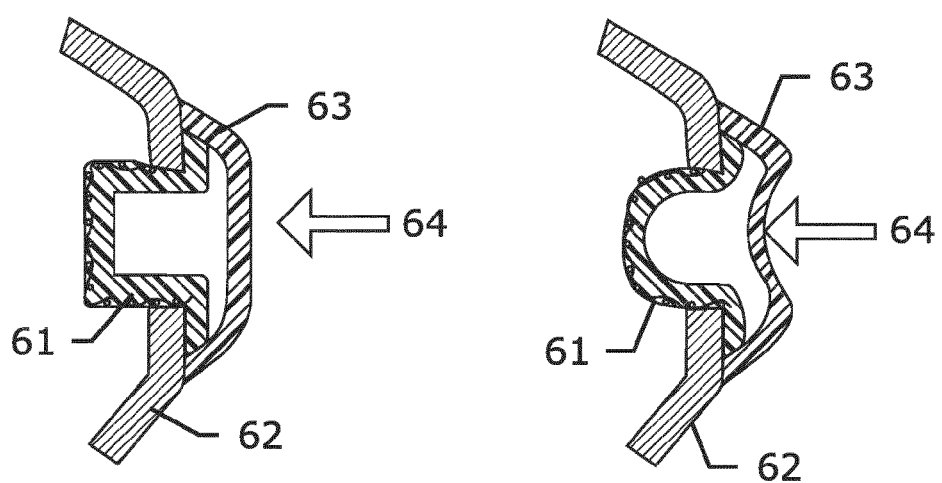
FIG. 4a shows schematically the use of an impact beam as subject of the invention to support a vehicle bumper (before impacting).
FIG. 4b shows schematically the use of an impact beam as subject of the invention to support a vehicle bumper (after impacting).

An impact beam is so provided, which may be used as support for soft bumpers of vehicles in FIG. 4a.

An impact beam 61 is connected to peripheral elements 62 of the vehicle coachwork. A soft bumper element 63 may be provided covering the impact beam 61. When the vehicle strikes an object, an impact force with a direction 64 will apply in as indicated in FIG. 4b.

As shown in FIG. 4b, the metal cord of the hybrid fabric present in the impact beam 61 will absorb the impact energy to a large extent thanks to the non-anchoring of the metal cord with the polymer matrix. Besides, as the metal cord is coming loose from the matrix within the matrix being put under high stress, together with the characteristic—the polymer material of the impact beam will adhere to the non-metal element of the hybrid fabric to a large extent, this to avoid that particles of the polymer material will be projected further towards the parts of the vehicles which are located behind the impact beam.

FIG. 5 also shows a force-displacement curve of two types of impact beams. The reference impact beam comprises a polymer matrix and a reinforcing structure of anchoring steel cords whose construction is 7×4×0.12 mm (curve 80) and the impact beam according to the present invention comprises the same polymer matrix and a reinforcing structure of non-anchoring steel cords whose construction is 3×0.265+9×0.245 mm (curve 90). It can be obviously seen from the FIG. 5 that curve 80 gets a big drop once the maximum force is reached and at the second drop, the whole part is broken into two and no load can be carried any more. That means the reference impact beam has a brittle behaviour. While in curve 90, it shows that it was much earlier a very small dip in this curve due to first matrix cracking, but still the force necessary to make the displacement increases. Besides, after the maximum force, there is a only gradual decrease in the load bearing capacity, and the beam is behaving ductile. This impact beam according to the present invention keeps its integrity and is still able to transfer load. So the work necessary to bend the beam is a higher in curve 90 than curve 80 but more importantly, the impact beam according to the present invention still has its integrity after the test.

The invention claimed is:

1. An impact beam comprising a polymer matrix and a reinforcing structure, said reinforcing structure comprising a number of metal reinforcing cords and non-metal elongated binding elements or non-metal coated elongated binding elements arranged between the metal reinforcing cords for holding the metal reinforcing cords together, each of said metal reinforcing cords has a metallic cross-sectional area $A_{metal}$, the ratio $\phi_c$ of the metallic area $A_{metal}$ to the area of the circle circumscribing said metal reinforcing cord ($\pi d_{cord}^2/4$) is at least 0.60, said metal reinforcing cords further having a non-chemical binding with said polymer matrix, wherein said non-metal elongated binding elements or non-metal coated elongated binding elements have a chemical bond with said polymer matrix.

2. An impact beam as claimed in claim 1, wherein said chemical bond is realized by bifunctional coupling agents, one functional group being responsible for the binding with the non-metal elongated binding elements or non-metal coated elongated binding elements, the other functional group reacting with the polymer.

3. An impact beam as claimed in claim 2, wherein said agents comprise silane compounds.

4. An impact beam as claimed in claim 1, wherein said polymer matrix comprises thermoplastic polymer material.

5. An impact beam as claimed in claim 4, wherein said thermoplastic polymer material is selected from the group consisting of thermoplastic elastomers, polypropylene, polyethylene, polyamide, polyethylene terephtalate, polybutylene terephtalate, polycarbonate, polyphenylene oxide, and blends of polypropylene, polyethylene, polyamide, polyethylene terephtalate, polybutylene terephtalate, polycarbonate, polyphenylene oxide.

6. An impact beam as claimed in claim 5, wherein said thermoplastic polymer material is a polypropylene- or polyamide-based thermoplastic elastomer.

7. An impact beam as claimed in claim 1, wherein said metal reinforcing cords are arranged in one or two directions.

8. An impact beam as claimed in claim 7, wherein said metal reinforcing cords are arranged in only one direction, said direction being the direction of the length of the impact beam.

9. An impact beam as claimed in claim 8, wherein the distance between adjacent metal reinforcing cords in said direction of the length of the impact beam is substantially equal to each other.

10. An impact beam as claimed in claim 7, wherein said metal reinforcing cords are provided in two directions where warp and weft are essentially perpendicular towards each other.

11. An impact beam as claimed in claim 10, wherein the distance between adjacent metal reinforcing cords of said warp being substantially identical to the distance between adjacent metal reinforcing cords of said weft.

12. An impact beam as claimed in claim 1, wherein said metal reinforcing cords are steel cords.

13. An impact beam as claimed in claim 12, wherein said steel cord has a construction selected out of the group consisting of 3+9, 1+18, 1×27.

14. An impact beam as claimed in claim 1, wherein said metal reinforcing cords have an anchoring force per unit length $f_a$ of less than 18 N/mm.

15. A bumper for a vehicle comprising:
an impact beam comprising a polymer matrix and a reinforcing structure, said reinforcing structure comprising a number of metal reinforcing cords and non-metal elongated binding elements or non-metal coated elongated binding elements arranged between the metal reinforcing cords for holding the metal reinforcing cords together, each of said metal reinforcing cords has a metallic cross-sectional area $A_{metal}$, the ratio $\phi_c$ of the metallic area $A_{metal}$ to the area of the circle circumscribing said metal reinforcing cord ($\pi d_{cord}^2/4$) is at least 0.60, said metal reinforcing cords further having a non-chemical binding with said polymer matrix, wherein said non-metal elongated binding elements or non-metal coated elongated binding elements have a chemical bond with said polymer matrix.

16. A structure to improve impact resistance of a vehicle's coachwork comprising:
an impact beam comprising a polymer matrix and a reinforcing structure, said reinforcing structure comprising a number of metal reinforcing cords and non-metal elongated binding elements or non-metal coated elongated binding elements arranged between the metal reinforcing cords for holding the metal reinforcing cords together, each of said metal reinforcing cords has a metallic cross-sectional area $A_{metal}$, the ratio $\phi_c$ of the metallic area $A_{metal}$ to the area of the circle circumscribing said metal reinforcing cord ($\pi d_{cord}^2/4$) is at least 0.60, said metal reinforcing cords further having a non-chemical binding with said polymer matrix, wherein said non-metal elongated binding elements or non-metal coated elongated binding elements have a chemical bond with said polymer matrix.

\* \* \* \* \*